US011424659B2

(12) United States Patent
Kozarekar et al.

(10) Patent No.: US 11,424,659 B2
(45) Date of Patent: Aug. 23, 2022

(54) ELECTRIC MACHINE WITH REDUCED HOUSING RESONANCE (71) Applicant: Ford Global Technologies, LLC, Dearborn, MI (US)

(72) Inventors: Shailesh Shrikant Kozarekar, Novi, MI (US); Chun Tang, Canton, MI (US); Joel Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 989 days.

(21) Appl. No.: 16/155,277

(22) Filed: Oct. 9, 2018

(65) Prior Publication Data

US 2020/0112226 A1 Apr. 9, 2020

(51) Int. Cl.
*H02K 5/24* (2006.01)
*H02K 15/02* (2006.01)
*H02K 1/16* (2006.01)
*H02K 5/00* (2006.01)

(52) U.S. Cl.
CPC .................. *H02K 5/24* (2013.01); *H02K 1/16* (2013.01); *H02K 15/024* (2013.01)

(58) Field of Classification Search
CPC .. H02K 5/24; H02K 5/00; H02K 1/16; H02K 1/20; H02K 1/06; H02K 15/02; H02K 15/024; H02K 15/028; H02K 9/10; H02K 9/12
See application file for complete search history.

(56) References Cited

U.S. PATENT DOCUMENTS

| | | | | |
|---|---|---|---|---|
| 4,012,653 A * | 3/1977 | Shigeta | ................... | H02K 1/16 310/432 |
| 4,450,373 A * | 5/1984 | Miller | ..................... | H02K 5/24 310/401 |
| 5,331,238 A * | 7/1994 | Johnsen | ................. | H02K 1/185 310/216.049 |
| 5,886,435 A | 3/1999 | Dymond | | |
| 7,288,870 B2 | 10/2007 | Mitcham et al. | | |
| 7,538,468 B2 * | 5/2009 | Kobayashi | ............. | H02K 1/185 310/216.049 |
| 7,812,494 B2 * | 10/2010 | Holopainen | ........... | H02K 5/225 310/91 |
| 8,395,287 B2 | 3/2013 | Bradfield | | |
| 8,901,789 B2 * | 12/2014 | Zook | ........................ | H02K 5/20 310/54 |

(Continued)

FOREIGN PATENT DOCUMENTS

| | | | | |
|---|---|---|---|---|
| CN | 112243557 A * | 1/2021 | ............... | H02K 1/20 |
| DE | 102009020481 A1 * | 11/2010 | ........... | H02K 19/103 |

(Continued)

*Primary Examiner* — Edgardo San Martin
(74) *Attorney, Agent, or Firm* — David B Kelley; Brooks Kushman P.C.

(57) ABSTRACT

An electric machine includes a cylindrical stator core and a cylindrical housing having an inner diameter. The core has an outer surface and a plurality of projections extending therefrom. An outer diameter of the core measured between tips of diametrically opposing projections is greater than the inner diameter. The core is disposed in the housing with the tips engaging the inner diameter to create an interference fit between the core and housing to reduce housing resonance.

13 Claims, 5 Drawing Sheets (56) References Cited

U.S. PATENT DOCUMENTS

| | | | | |
|---|---|---|---|---|
| 9,653,960 | B2* | 5/2017 | Matsuda | H02K 5/24 |
| 9,735,630 | B2* | 8/2017 | Chong | H02K 1/20 |
| 10,658,889 | B2* | 5/2020 | Tran | H02K 5/24 |
| 2007/0210669 | A1* | 9/2007 | Fukasaku | H02K 1/185 |
| | | | | 310/216.023 |
| 2014/0117806 | A1* | 5/2014 | Jaganjac | H02K 1/18 |
| | | | | 310/216.058 |
| 2020/0144882 | A1* | 5/2020 | Tang | H02K 1/30 |

FOREIGN PATENT DOCUMENTS

| | | | | |
|---|---|---|---|---|
| EP | 3116106 A1 | * | 1/2017 | H02K 9/06 |
| WO | WO-2012159791 A2 | * | 11/2012 | H02K 1/185 |
| WO | WO-2020177411 A1 | * | 9/2020 | H02K 1/12 |

* cited by examiner

ELECTRIC MACHINE WITH REDUCED HOUSING RESONANCE

TECHNICAL FIELD

This disclosure relates to electric machines, and more specifically to stator and housing designs that reduce resonance of the housing.

BACKGROUND

Electric machines typically include a stator and a rotor that cooperate to convert electrical energy into mechanical motion or vice versa. The stator may include a core and windings, and a rotor is supported for rotation within the stator.

Electric machines may be used in vehicles such as battery-electric vehicles and hybrid-electric vehicles that contain a traction-battery assembly to act as an energy source for the electric machine. The traction-battery assembly, for example, is electrically connected to the electric machine that provides torque to driven wheels. The traction-battery assembly may include components and systems to assist in managing vehicle performance and operations.

SUMMARY

According to one embodiment, an electric machine includes a cylindrical stator core and a cylindrical housing having an inner diameter. The core has an outer surface and a plurality of projections extending therefrom. An outer diameter of the core measured between tips of diametrically opposing projections is greater than the inner diameter. The core is disposed in the housing with the tips engaging the inner diameter to create an interference fit between the core and housing to reduce housing resonance.

According to another embodiment, a method of assembling an electric machine includes providing a plurality of laminations having an outer circumferential surface and projections radially extending therefrom. The method further includes stacking the laminations with the projections of adjacent laminations circumferentially offset relative to each other to form a stator core having the projections in a staggered arrangement and inserting the core into a cylindrical housing with the projections engaging with an inner diameter of the housing.

According to yet another embodiment, an electric machine includes a housing and a stator. The stator includes stacked laminations that each define outwardly extending projections that are circumferentially spaced relative to each other. The projections of adjacent ones of the laminations are circumferentially offset relative to each other to create a staggered arrangement of the projections on an outer surface of the stator. The stator is disposed in the housing with the projections engaging the housing to reduce housing resonance.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
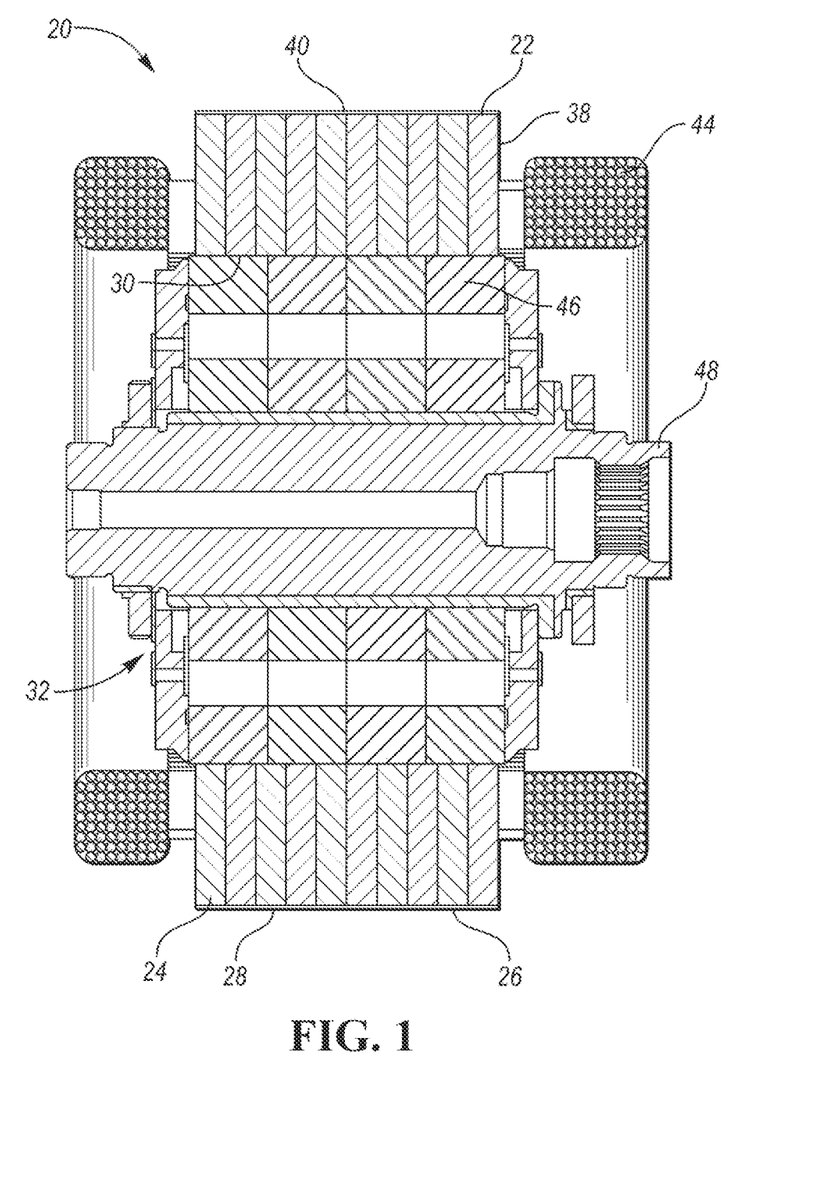
FIG. 1 is a cross-sectional side view of an electric machine with the housing not shown.
Figure 2:
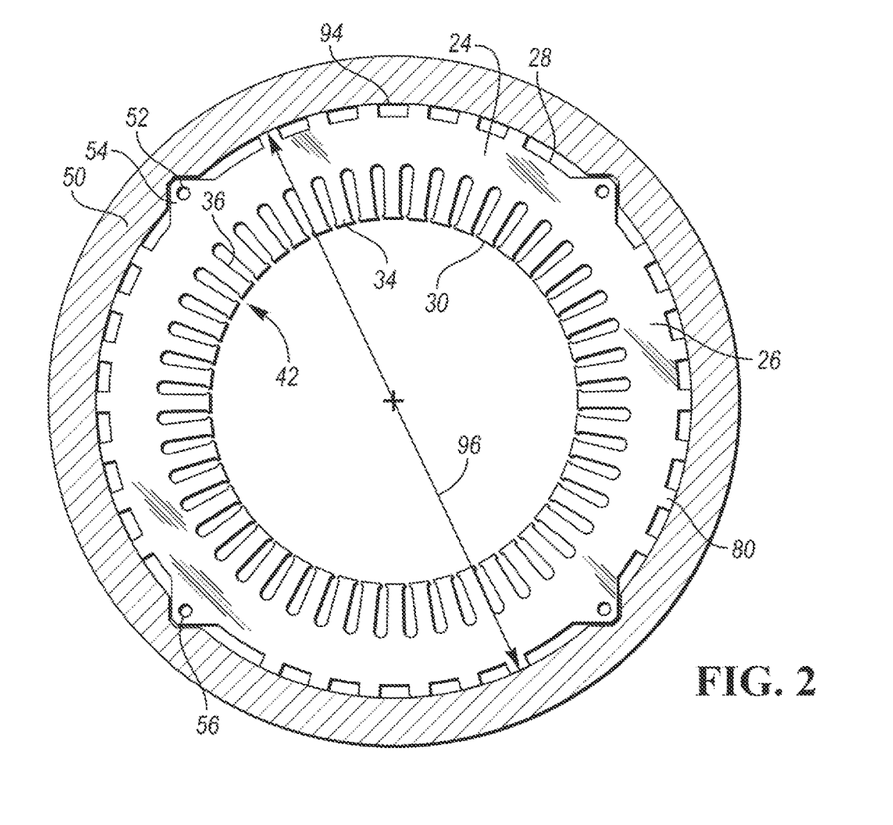
FIG. 2 is a cross-sectional end view of a stator core and a housing of the electric machine.

Referring to FIGS. 1 and 2, an example electric machine 20 includes a stator 22 having a plurality of laminations 24. (The thickness of the laminations 24 are exaggerated in FIG. 1 for clarity.) The laminations 24 are typically steel. Each of the laminations 24 includes a front side and a back side. When stacked, the front and back sides are disposed against adjacent front and back sides to form a stator core 26. Each of the laminations 24 may be doughnut shaped and define a hollow center. Each lamination 24 also includes an outer diameter (or outer wall) 28 and an inner diameter (or inner wall) 30. The outer diameters 28 cooperate to define an outer surface 40 of the stator core 26, and the inner diameters 30 cooperate to define a cavity 32.

Each lamination 24 includes a plurality of teeth 34 extending radially inward toward the inner diameter 30. Adjacent teeth 34 cooperate to define slots 36. The teeth 34 and the slots 36 of each lamination 24 are aligned with adjacent laminations to define stator slots 42 extending through the stator core 26 between the opposing ends 38. A plurality of windings (also known as coils, wires, or conductors) 44 are wrapped around the stator core 26 and are disposed within the stator slots 42. The windings 44 may be disposed in an insulating material (not shown). Portions of the windings 44 generally extend in an axial direction along the stator slots 42. At the ends 38 of the stator core, the windings 44 bend to extend circumferentially around the ends 38 of the stator core 26 forming end windings. The ends 38 define the opposing ends of the core 26 and may be formed by the first and last laminations of the stator core 26. While shown as having distributed windings, the windings could also be concentrated, hairpins, or other type.

A rotor 46 is disposed within the cavity 32. The rotor 46 is fixed to a shaft 48 that is operably connected to a gearbox or other drivetrain component. When current is supplied to the stator 22, a magnetic field is created causing the rotor 46 to spin within the stator 22 generating a torque that is supplied to the shaft 48. The electric machine 20 is also configured to convert torque on the shaft 48 in to electrical power when acting a generator.

The stator 22 and the rotor 46 may be supported within a housing 50. The housing 50 may be cylindrical and have a diameter configured to receive the stator 22. The housing 50 is typically formed of aluminum. The stator 22 may include mounting lobes 52 used to attach the stator 22 to the housing 50. The housing may define grooves 54 that receive an end portion of the lobes 52. Each the lobes 52 may define an opening 56 configured to receive a rod, such as a bolt, therethrough. The rods extend through ends (not shown) of the housing 50 to secure the stator 22.

Figure 3:
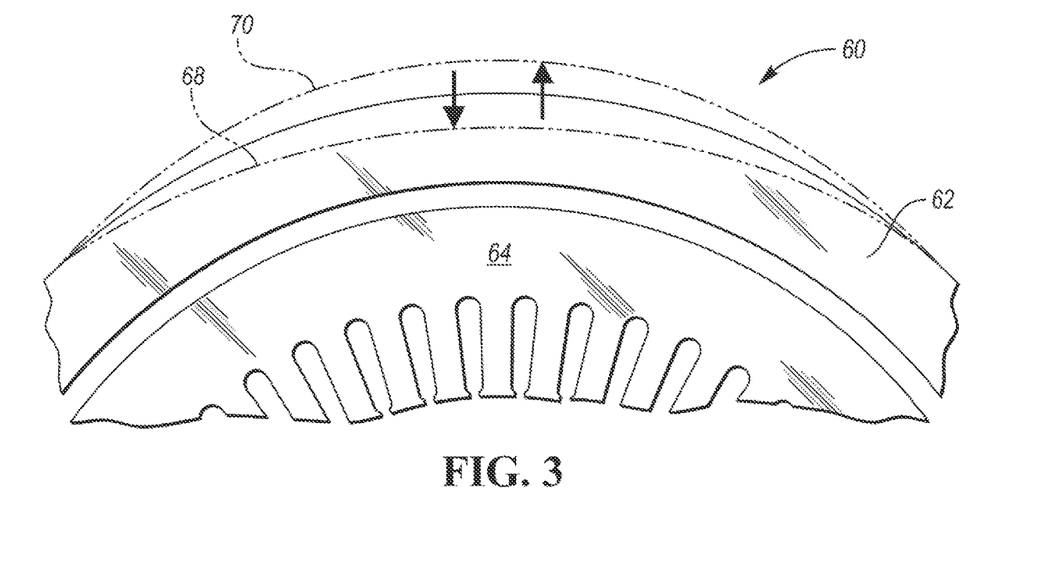
FIG. 3 is a diagrammatically view illustrating housing resonance of an electric machine that does not include the improvements of this disclosure.

Referring to FIG. 3, one problem associated with electric machines will be described. An electric machine 60 includes a housing 62 and a stator core 64. The stator core 64 is significantly stiffer than the housing 62. For example, the stator core 64 may be formed from steel and the housing may be formed from aluminum. The relatively lower stiffness of the housing 62 compared to the stator core 66 results in housing resonance in an area between attachments when the electric machine is operating. The dashed lines 68 and 70 illustrate exaggerated movement of the housing 62 due to the resonance. This movement may create unacceptable noise and vibration. This disclosure describes stator designs that reduce housing resonance to provide more acceptable noise and vibration for electric machines.

Figure 4:
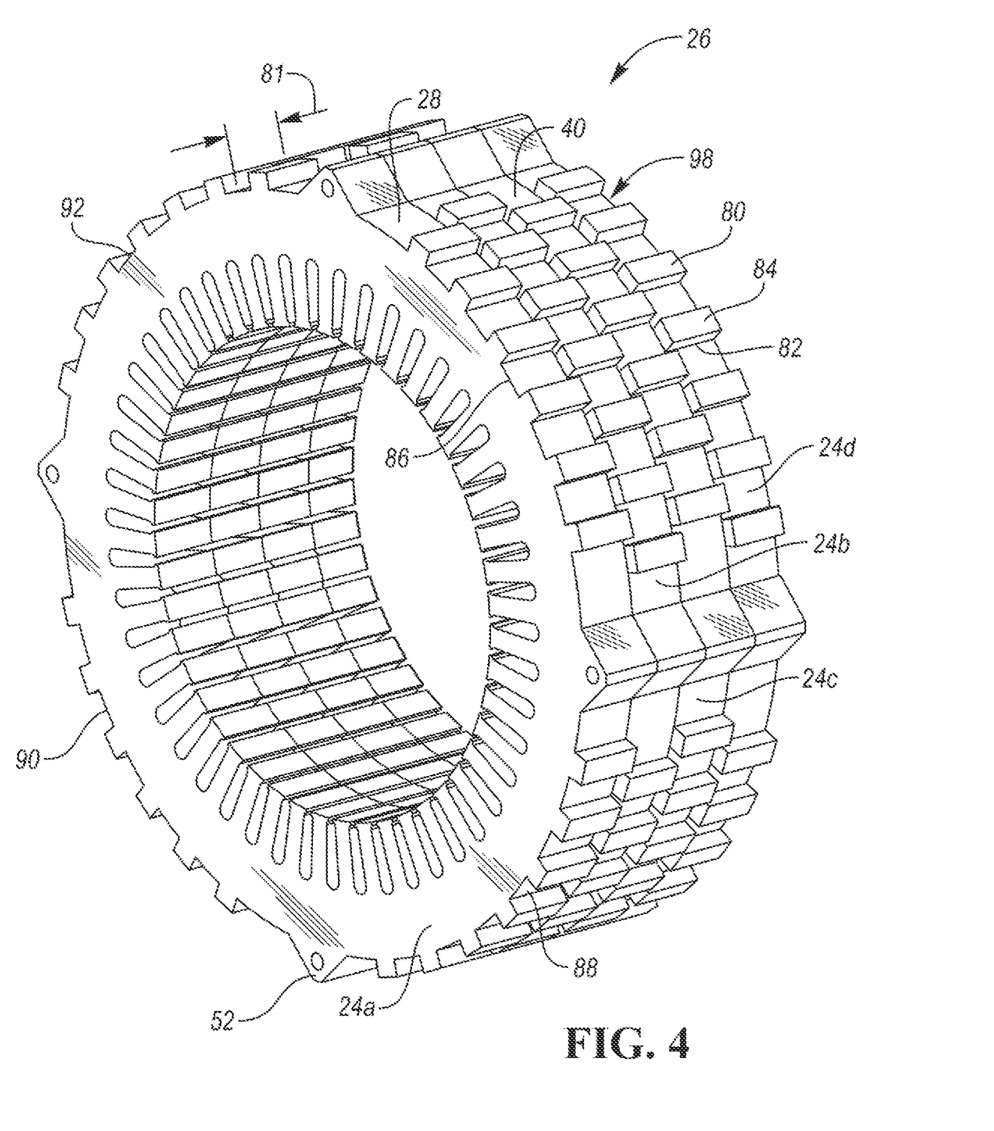
FIG. 4 is a partial perspective view of a stator core according to one embodiment of this disclosure.

Referring to FIGS. 2 and 4, the stator core 26 may include a plurality of projections 80 disposed on the outer surface 40. The projections 80 may be integrally formed with the laminations 24 and may include a base 82 attached to the outer diameter 28 and a tip 84. The projections 80 may be prismatic and may have a rectangular cross section when viewed in the axial direction of the electric machine. The projections 80 may extend the thickness 81 of the laminations 24. The projections 80 are located on circumferential surfaces of the outer diameter 28 defined between adjacent lobes 52. Different ones of the circumferential surfaces may include different amounts of projections 80. For example, circumferential surface 86 may include six projections 80, circumferential surface 88 may include seven projections, circumferential surface 90 may include six projections, and circumferential surface 92 may include seven projections. In the illustrated embodiment, diametrically opposing circumferential surfaces have the same number of projections and the projections are located in the same location, but this need not always be the case. The shown placement and amount of projections 80 are merely illustrative and are not limiting.

The projections 80 are configured to engage with the housing 50 to support the housing between the lobes 52 and reduce housing resonance. The interference contact through the projections improves the stiffness of the entire stator-housing assembly. This helps to lower the assembly resonance during the operation frequency range. The projections 80 may be sized to form an interference fit (press fit) with the housing 50. An interference fit can be formed by inserting an inner component into an outer component having an inner diameter that is smaller than an outer diameter of the inner component. The tightness of an interference fit is based on the amount of interference (size difference between the inner and outer diameters).

The electric machine 20 may include an interference fit between the tips 84 of the projections 80 and an inner diameter 94 of the housing 50. The interference fit is formed by making an outer diameter 96 of the core (measured between diametrically opposing tips 84 of the projections 80) greater than the inner diameter 94. The amount of interference may be dependent upon the size of the electric machine as wheel as other design specifics, such as materials and shape. As an example, a 0.1 to 0.5 millimeter (mm) interference may be used for a stator having a 236 mm diameter.

The outer surface 40 of the stator core 26 may have a staggered arrangement of projections 80. The projections 80 may be circumferentially staggered, that is, axially adjacent ones of the projections 80 are not aligned with each other. The staggered arrangement may provide better support of the housing 50 than linear arrangements in which that projections are axially aligned, which may further reduce housing resonance. The projections 80 of adjacent ones of the laminations may be circumferentially offset, i.e., rotated, relative to each other to create the staggered arrangement of the projections 80. In the illustrated embodiment of FIG. 4, the projections 80 of adjacent laminations are offset such that the projections 80 of one of the laminations is aligned with a midpoint of the gaps 98 between projections 80 of the other lamination.

The staggered arrangement may be formed by using multiple different types of laminations, or with same laminations that are rotated relative to each other to create the staggered arrangement. In the illustrated embodiment of FIG. 4, all of the laminations 24 are the same. Used herein, "same" refers to components that are designed to be the same and recognizes that two components are rarely the exact same due to manufacturing limitations. The staggered arrangement is created by rotating the second lamination 24b and the fourth lamination 24d by 90 degrees relative to the first and third laminations 24a, 24c. By doing so, the number of projections between the lobes 52 alternates between six or seven projections in an axial direction (lengthwise) of the stator core 26 creating the staggered arrangement. Using same laminations may reduce manufacturing costs and assembly complexity.

Figure 5:
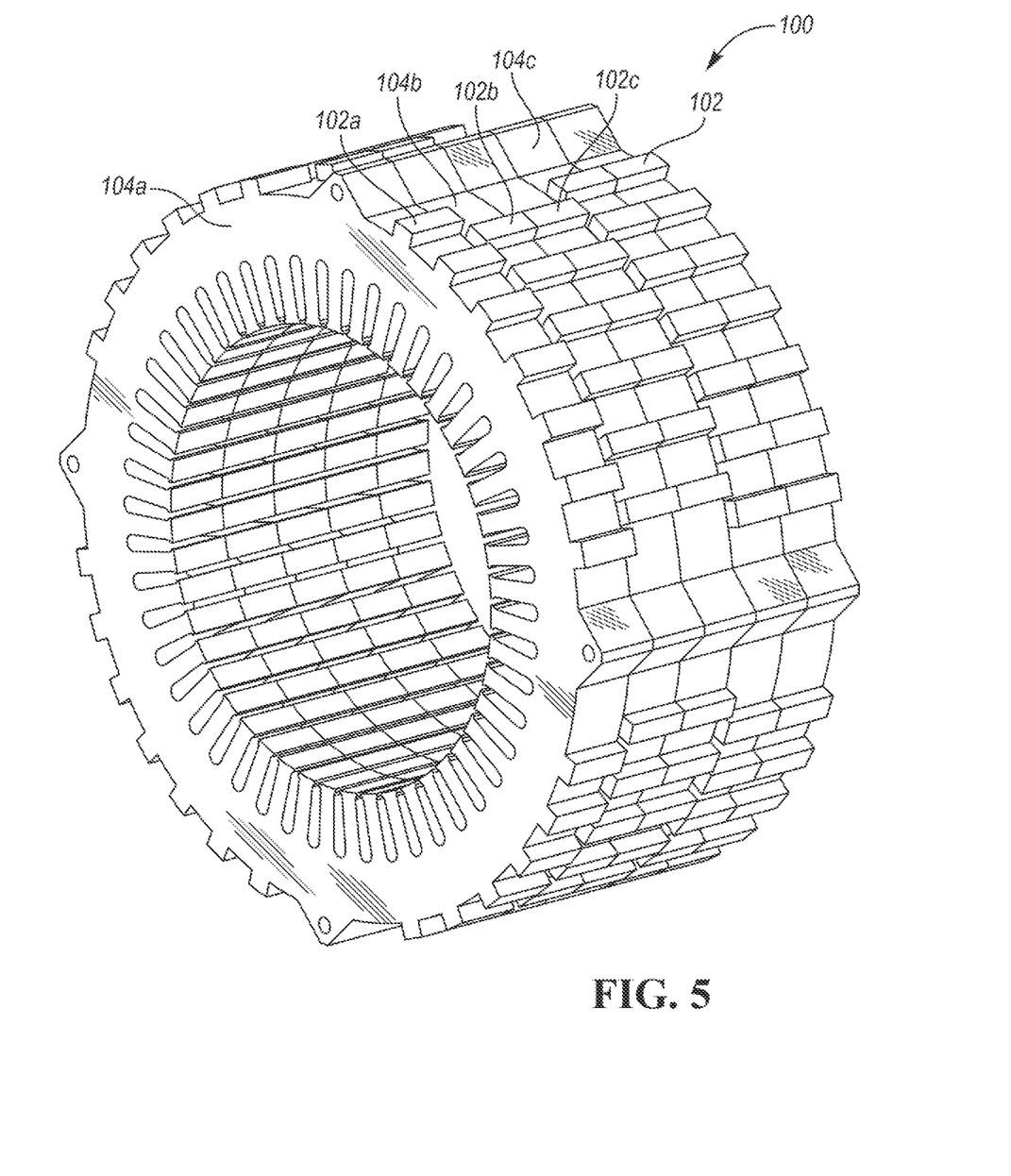
FIG. 5 is a partial perspective view of a stator core according to another embodiment of this disclosure.

Referring to FIG. 5, another stator core 100 may include a partial staggered arrangement of projections 102. In this embodiment, each projection 102 is axially aligned with one adjacent projection and is circumferentially offset relative to another adjacent projection. For example, the projections 102b on lamination 104b are axially aligned with the projections 102c of lamination 104c and are circumferentially offset relative to the projections 102a of lamination 104a. This creates a partial staggered arrangement in which the circumferential position of the projections changes every two laminations (this may be called a 2-2 pattern). In other embodiments, three (3-3 pattern), four (4-4 pattern), or more laminations may be grouped to have the same projection pattern. Also, the groupings need not have a uniform number of laminations. For example, the stator may include a 1-2 pattern in which the first lamination has a first projection pattern, the second and third laminations have a second projection pattern, and the four projection repeats the sequence and has a projection pattern that matches the first lamination. Of course, 2-3 patterns, etcetera, are also contemplated.

Similar to stator 22, the partial staggered arrangement may be created by using different laminations or by using same laminations that are rotated relative to each other. In the illustrated embodiment of FIG. 5, each of the laminations 104 are the same, and laminations 104b and 104c are rotated 90 degrees relative to laminations 104a and 104d to create the partial staggered arrangement.

Figure 6:
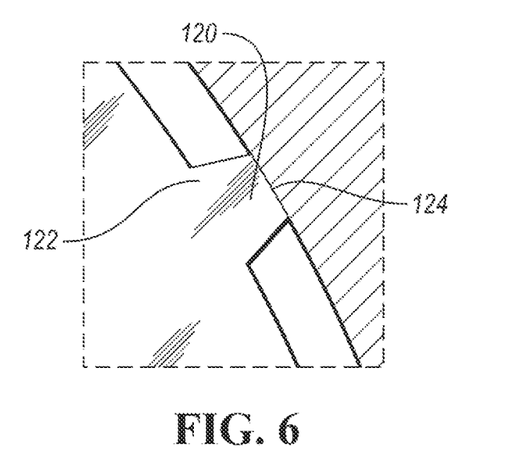
FIG. 6 is an end view of a trapezoidal projection.

Referring to FIG. 6, the projections may have different axial cross-sections in different embodiments. In the above described embodiments, the projections had a rectangular axial cross-section. In the embodiment of FIG. 6, however, the projections 120 have a trapezoidal axial cross-section in which the base 122 of the projection is wider than the tip 124. The trapezoidal shape may reduce local stress.

Figure 7:
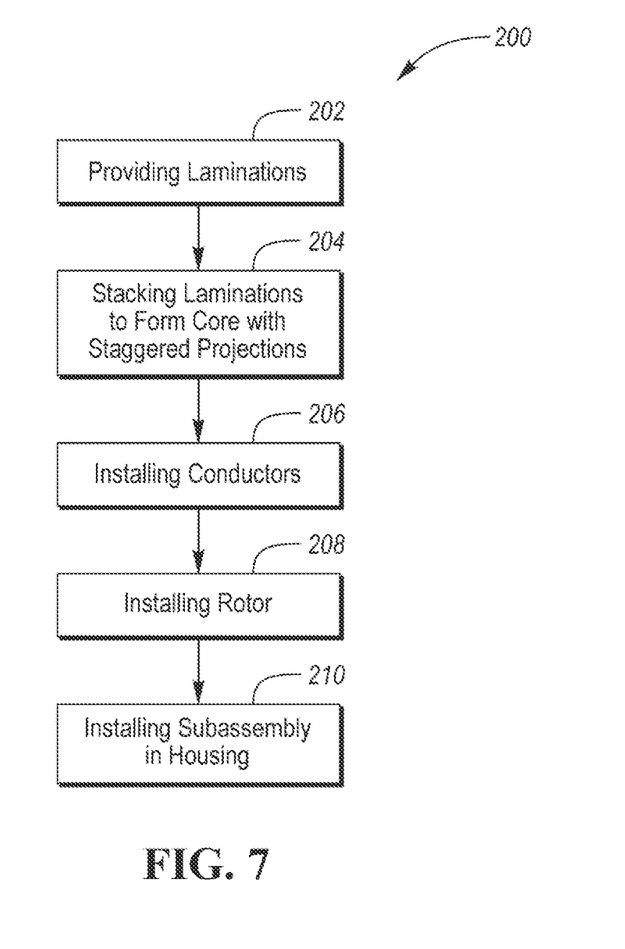
FIG. 7 is a flow chart illustrating a method of manufacturing an electric machine.

FIG. 7 illustrates an example method 200 of assembling an electric machine having staggered projections designed to reduce housing resonance. A plurality of laminations are provided at step 202. Each of the laminations may have an outer circumferential surface and projections extending radially outward therefrom. Each of the laminations may be the same. At 204 the laminations are stacked with the projections of adjacent laminations circumferentially offset relative to each other to form a stator core having the projections in a staggered arrangement. In embodiments in which the laminations are the same, the stacking the laminations may further include placing adjacent laminations in different rotational positions so that the projections of the adjacent laminations are staggered. In some embodiments, this involves rotating select laminations 90 degrees relative to other laminations.

At step 206, conductors are installed into the stator core to create windings of the electric machine. At step 208, the rotor is installed within the cavity of the stator to form a subassembly. At step 210, the subassembly is installed in a housing by inserting the stator core such that the projections engage with an inner diameter of the housing. The laminations may include a diameter at the projections that is larger than the inner diameter of the housing to create a interference fit between the projections and the housing to reduce housing resonance. The stator core may also be attached to the housing by fasteners and the like.

It is to be understood that the illustrated method 200 is not an exhaustive list of steps for fully assembling an electric machine and instead focuses on steps pertaining to the particular improvements of this disclosure and other major assembly steps. Many well-known assembly steps have not been discussed for brevity but are contemplated by the disclosure. Furthermore, the method 200 is not limited to the particular order of illustrated steps, and some steps may be omitted in some implementations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
 a cylindrical housing having an inner diameter; and
 a cylindrical stator core having an outer surface and a plurality of projections extending therefrom, wherein an outer diameter of the core measured between tips of the projections is greater than the inner diameter, and the core is disposed in the housing with the tips engaging the inner diameter to create an interference fit between the core and housing to reduce housing resonance, wherein the core includes a plurality of stacked laminations that each have a subset of the projections formed thereon, wherein the laminations are arranged such that the subset of projections of each of the laminations are circumferentially offset relative to the subset of projections of a first adjacent one of the laminations and such that the subset of projections of each of the laminations are circumferentially aligned relative to the subset of projections of a second adjacent one of the laminations to partially stagger the projections.

2. The electric machine of claim 1, wherein the laminations are the same.

3. The electric machine of claim 1, wherein the projections are prismatic.

4. The electric machine of claim 3, wherein the projections have trapezoidal cross sections.

5. An electric machine comprising:
 a cylindrical housing having an inner diameter; and
 a cylindrical stator core having an outer surface and a plurality of projections extending therefrom, wherein an outer diameter of the core measured between tips of the projections is greater than the inner diameter, and the core is disposed in the housing with the tips engaging the inner diameter to create an interference fit between the core and housing to reduce housing resonance, wherein the core includes a plurality of stacked laminations, each lamination having:
 at least three mounting lobes projecting radially outward and defining holes,
 a first circumferential surface defined between first and second ones of the lobes and having a first subset of the projections formed thereon, and
 a second circumferential surface defined between second and third ones of the lobes and having a second subset of the projections formed thereon, wherein the first subset includes more projections than the second subset.

6. The electric machine of claim 5, wherein each of the projections extends an entire thickness of an associated one of the laminations.

7. The electric machine of claim 5, wherein the inner diameter defines axially extending recesses that receive the lobes therein.

8. The electric machine of claim 1 further comprising a rotor supported for rotation within the stator core.

9. An electric machine comprising:
 a housing; and
 a stator including stacked laminations, each lamination defining at least three mounting lobes projecting radially outward and defining holes, outwardly extending projections that are circumferentially spaced relative to each other, a first circumferential surface defined between first and second ones of the lobes and having a first subset of the projections formed thereon, and a second circumferential surface defined between second and third ones of the lobes and having a second subset of the projections formed thereon, wherein the first subset includes more projections than the second subset, and wherein the projections of adjacent ones of the laminations are circumferentially offset relative to each other to create a staggered arrangement of the projections on an outer surface of the stator, wherein the stator is disposed in the housing with the projections engaging the housing to reduce housing resonance.

10. The electric machine of claim 9, wherein an outer diameter of the laminations measured between tips of the projections is larger than an inner diameter of the housing so that an interference fit is formed between the stator and the housing.

11. The electric machine of claim 9, wherein the projections are prismatic.

12. The electric machine of claim 11, wherein the projections have trapezoidal cross sections.

13. The electric machine of claim 9, wherein the laminations include teeth that cooperate to define axially extending slots, and further comprising windings disposed in the slots.

* * * * *